US012760141B2

(12) United States Patent
Tsukamoto et al.

(10) Patent No.: US 12,760,141 B2
(45) Date of Patent: Oct. 13, 2026

(54) AQUEOUS RESIN CROSSLINKING AGENT, AQUEOUS RESIN CROSSLINKING AGENT-CONTAINING LIQUID, AND AQUEOUS RESIN COMPOSITION

(71) Applicant: Nisshinbo Chemical Inc., Tokyo (JP)

(72) Inventors: Nami Tsukamoto, Chiba (JP); Naoki Nishikawa, Toda (JP)

(73) Assignee: NISSHINBO CHEMICAL INC., Tokyo (JP)

(*) Notice: Subject to any disclaimer, the term of this patent is extended or adjusted under 35 U.S.C. 154(b) by 602 days.

(21) Appl. No.: 18/022,281

(22) PCT Filed: Aug. 20, 2021

(86) PCT No.: PCT/JP2021/030668
§ 371 (c)(1),
(2) Date: Feb. 21, 2023

(87) PCT Pub. No.: WO2022/045022
PCT Pub. Date: Mar. 3, 2022

(65) Prior Publication Data

US 2023/0323004 A1 Oct. 12, 2023

(30) Foreign Application Priority Data

Aug. 25, 2020 (JP) ................................ 2020-141968

(51) Int. Cl.
*C08G 18/02* (2006.01)
*C08G 18/79* (2006.01)
*C08L 79/00* (2006.01)

(52) U.S. Cl.
CPC .......... *C08G 18/025* (2013.01); *C08G 18/79* (2013.01); *C08L 79/00* (2013.01)

(58) Field of Classification Search
None
See application file for complete search history.

(56) References Cited

U.S. PATENT DOCUMENTS

| | | | | |
|---|---|---|---|---|
| 2018/0371237 | A1* | 12/2018 | Tsukamoto | C08G 18/09 |
| 2019/0174848 | A1 | 6/2019 | Enomoto et al. | |
| 2022/0135770 | A1 | 5/2022 | Tsukamoto | |
| 2023/0135772 | A1* | 5/2023 | Ebe | C08G 18/168 |

FOREIGN PATENT DOCUMENTS

| | | | | | |
|---|---|---|---|---|---|
| JP | 2020057712 | * | 3/2020 | C09D 179/00 |
| WO | WO 2017/006950 | A1 | 1/2017 | |
| WO | WO 2017/217542 | A1 | 12/2017 | |
| WO | WO 2020/179835 | A1 | 9/2020 | |
| WO | WO-2021193950 | A1 * | 9/2021 | C08L 75/04 |

OTHER PUBLICATIONS

JP2020-057712 foreign priority document English machine translation, 2020. (Year: 2020).*
International Search Report for International Application No. PCT/JP2021/030668, dated Oct. 26, 2021, with an English translation.
Written Opinion of the International Searching Authority for International Application No. PCT/JP2021/030668, dated Oct. 26, 2021, with an English translation.

* cited by examiner

*Primary Examiner* — Christopher M Rodd
(74) *Attorney, Agent, or Firm* — Birch, Stewart, Kolasch & Birch, LLP

(57) ABSTRACT

Provided is a waterborne resin crosslinking agent, as well as a waterborne resin crosslinking agent-containing liquid and a waterborne resin composition, including the waterborne resin crosslinking agent. The waterborne resin crosslinking agent of the present invention includes a polycarbodiimide compound (A) and a polycarbodiimide compound (B); the polycarbodiimide compound (A) has a structure in which the isocyanate groups at both terminals are each capped with a predetermined hydrophilic organic compound; the polycarbodiimide compound (B) has, as a structural unit, a diisocyanate compound having one cyclohexyl ring or one benzene ring, and has a structure in which the isocyanate groups at both terminals are each capped with a predetermined organic compound, and the polycarbodiimide compound (A) is in an amount of 5 to 90 parts by mass per 100 parts by mass in total of the polycarbodiimide compounds (A) and (B).

18 Claims, No Drawings

AQUEOUS RESIN CROSSLINKING AGENT, AQUEOUS RESIN CROSSLINKING AGENT-CONTAINING LIQUID, AND AQUEOUS RESIN COMPOSITION

TECHNICAL FIELD

The present invention relates to a carbodiimide-based waterborne resin crosslinking agent as well as a waterborne resin crosslinking agent-containing liquid and a waterborne resin composition, including the carbodiimide-based waterborne resin crosslinking agent.

BACKGROUND ART

A waterborne resin, which has water solubility or water dispersibility, is excellent in handleability in terms of the environment and safety, and thus is used in various applications such as a paint, an ink, a fiber treatment agent, an adhesive, a coating agent, and pressure-sensitive adhesive. In the waterborne resin, a hydrophilic group such as a hydroxyl group or a carboxy group is introduced in order to impart water solubility or water dispersibility to the resin itself. Therefore, the waterborne resin tends to be inferior in water resistance and durability to an oil resin.

Because of this, in order to improve various physical properties such as water resistance, durability, and strength of the waterborne resin, a crosslinking agent is added to the waterborne resin.

As an example of such a crosslinking agent, a polycarbodiimide compound is known. For example, PTL 1 describes that mixing two types of polycarbodiimide compounds, including a polycarbodiimide compound having a predetermined hydrophilic group at the terminal in a predetermined ratio, enables a waterborne resin crosslinking agent providing excellent storage stability when co-present with a waterborne resin, and retaining crosslinking performance even when co-present therewith for a long period of time to be obtained.

CITATION LIST

Patent Literature

PTL1: WO 2017/006950

SUMMARY OF INVENTION

Technical Problem

With the recent expansion of applications of various types of waterborne resins, cured products of the waterborne resins are required for various physical properties depending on applications. For example, automotive coating applications require improvement in hardness of coating films of the waterborne resin, excellent solvent resistance thereof and the like.

In response to such a demand, the present inventors focused on a carbodiimide-based crosslinking agent having excellent storage stability as described above, diligently have investigated to improve physical properties of a cured product of waterborne resin, and then have found a waterborne resin crosslinking agent capable of improving hardness and solvent resistance of a waterborne resin coating film.

An object of the present invention is to provide a carbodiimide-based waterborne resin crosslinking agent which has excellent storage stability in an aqueous medium and excellent storage stability when co-present with a waterborne resin, and also is capable of improving hardness and solvent resistance of a coating film of the cured product of waterborne resin, as well as a waterborne resin crosslinking agent-containing liquid and a waterborne resin composition, including the carbodiimide-based waterborne resin crosslinking agent.

Solution to Problem

The present invention is based on the finding that, in a carbodiimide-based waterborne resin crosslinking agent, use of a mixture of specific polycarbodiimide compounds enables a cured film of a cured product of waterborne resin, having high hardness and favorable solvent resistance to be obtained.

The present invention provides the following means below.

[1] A waterborne resin crosslinking agent, including a polycarbodiimide compound (A) and a polycarbodiimide compound (B), wherein the polycarbodiimide compound (A) has a structure in which isocyanate groups at both terminals are each capped with a hydrophilic organic compound, and at least one of the hydrophilic organic compounds has a molecular weight of 340 or more, the polycarbodiimide compound (B) has, as a structural unit, a diisocyanate compound having one cyclohexyl ring or one benzene ring, and has a structure in which isocyanate groups at both terminals are each capped with an organic compound having a molecular weight of 300 or less, and the polycarbodiimide compound (A) is in an amount of 5 to 90 parts by mass per 100 parts by mass in total of the polycarbodiimide compound (A) and the polycarbodiimide compound (B).

[2] The waterborne resin crosslinking agent according to [1], wherein the hydrophilic organic compound having a molecular weight of 340 or more is a compound represented by the following formula (1):

$$R^1(OCHR^2CH_2)_nOH \quad (1)$$

wherein $R^1$ is an alkyl group, cycloalkyl group, or aryl group having 1 to 20 carbon atoms, $R^2$ is a hydrogen atom or a methyl group, and n is a numeral of 7 to 30.

[3] The waterborne resin crosslinking agent according to [2], wherein in the formula (1), $R^1$ is a methyl group and $R^2$ is a hydrogen atom.

[4] The waterborne resin crosslinking agent according to any one of [1] to [3], wherein the organic compound having a molecular weight of 300 or less is a compound having one functional group that reacts with an isocyanate group.

[5] The waterborne resin crosslinking agent according to any one of [1] to [4], wherein the organic compound having a molecular weight of 300 or less is a compound selected from the group consisting of a primary or secondary monoamine, a monoisocyanate, a monool, a monoepoxide, and a monocarboxylic acid.

[6] The waterborne resin crosslinking agent according to any one of [1] to [5], wherein the diisocyanate compound is a compound having a primary isocyanate group.

[7] A waterborne resin crosslinking agent-containing liquid, including the waterborne resin crosslinking agent according to any one of [1] to [6], and an aqueous medium.

[8] The waterborne resin crosslinking agent-containing liquid according to [7], wherein the aqueous medium is water or a mixed solvent of water and a hydrophilic solvent.

[9] The waterborne resin crosslinking agent-containing liquid according to [7] or [8], further including a surfactant.

[10] The waterborne resin crosslinking agent-containing liquid according to [9], wherein the surfactant is an anionic surfactant.

[11] The waterborne resin crosslinking agent-containing liquid according to [10], wherein the anionic surfactant is one or more selected from the group consisting of an alkylbenzenesulfonate, an alkylsulfate, and sodium N-cocoyl methyl taurate.

[12] A waterborne resin composition, including the waterborne resin crosslinking agent according to any one of [1] to [6] and a waterborne resin.

[13] The waterborne resin composition according to [12], wherein the waterborne resin has a functional group selected from the group consisting of a carboxy group, an amino group and a hydroxyl group.

[14] The waterborne resin composition according to [12] or [13], wherein the waterborne resin is one or more selected from the group consisting of a polyester resin, an acrylic resin, a polyurethane resin, an epoxy resin, a styrene-acrylic resin, a melamine resin, a polyolefin resin, and a fluororesin.

[15] The waterborne resin composition according to any one of [12] to [14], wherein the waterborne resin composition is used for an adhesive, a fiber treatment agent, a coating agent, an ink, a paint, or a pressure-sensitive adhesive.

[16] The waterborne resin composition according to any one of [12] to [14], wherein the waterborne resin composition is for wet-on-wet coating.

[17] A cured film formed of the waterborne resin composition according to any one of [12] to [16].

[18] An article including the cured film according to [17] formed on a base material.

Advantageous Effects of Invention

The waterborne resin crosslinking agent of the present invention has excellent storage stability in an aqueous medium and excellent storage stability when co-present with the waterborne resin. Moreover, using the waterborne resin crosslinking agent can improve hardness and solvent resistance of a coating film of a cured product of the waterborne resin.

Therefore, a waterborne resin composition including the waterborne resin crosslinking agent can be suitably used for applications such as an adhesive and a fiber treatment agent, a coating agent, an ink, a paint, and a pressure-sensitive adhesive.

DESCRIPTION OF EMBODIMENTS

Hereinafter, the waterborne resin crosslinking agent of the present invention as well as the waterborne resin crosslinking agent-containing liquid and the waterborne resin composition, including the waterborne resin crosslinking agent, will be described in detail.

"Waterborne" as used in the present invention means having solubility or dispersibility in an aqueous medium. The "aqueous medium" refers to water and/or a hydrophilic solvent. Moreover, the "polycarbodiimide compound" refers to a compound having two or more carbodiimide groups.

[Waterborne Resin Crosslinking Agent]

The waterborne resin crosslinking agent of the present invention includes a polycarbodiimide compound (A) and a polycarbodiimide compound (B), and is characterized in that the polycarbodiimide compound (A) is in an amount of 5 to 90 parts by mass per 100 parts by mass in total of (A) and (B). Namely, the waterborne resin crosslinking agent includes two types of polycarbodiimide compounds, (A) and (B).

The waterborne resin crosslinking agent having such a blending composition has excellent storage stability in an aqueous medium and excellent storage stability when co-present with the waterborne resin and can improve hardness and solvent resistance of a coating film of a cured product of the waterborne resin.

(Polycarbodiimide Compounds (A))

Polycarbodiimide compound (A) is a polycarbodiimide compound having a structure in which the isocyanate groups at both terminals are capped with hydrophilic organic compounds, respectively, and at least one of the hydrophilic organic compounds has a molecular weight of 340 or more.

<Hydrophilic Organic Compound>

The hydrophilic organic compound is preferably a compound having one or more functional groups that are reactive with an isocyanate group and one or more heteroatoms in the structure other than the functional groups. The aforementioned functional groups include a hydroxyl group, a primary amino group, a secondary amino group, an epoxy group, an isocyanate group, a carboxy group, and the like. Namely, the hydrophilic organic compound more preferably has any functional group selected from the group consisting of a hydroxyl group, a primary amino group, a secondary amino group, an epoxy group, an isocyanate group, and a carboxy group, and has one or more heteroatoms in the structure other than the functional groups.

The hydrophilic organic compound is preferably a compound selected from the group consisting of a monoamine, a monoisocyanate, a monool, a monoepoxide and a monocarboxylic acid. More preferably, the hydrophilic organic compound is a monool or a monoamine, having one of a hydroxyl group, a primary amino group or a secondary amino group as the functional group at the terminal of the molecular chain, and having one or more heteroatoms in the structure other than the functional group. The monool or monoamine may have an anionic and/or cationic group.

Examples of the hydrophilic organic compounds include a polyoxyalkylene monoalkyl ether, a monohydroxypolyester, a monohydroxyalkyl sulfonate, a dialkylamino alcohol, a hydroxycarboxylic acid alkyl ester, a dialkylaminoalkylamine, a polyoxyalkylene monoamine, a polyoxyalkylenediamine, and a polyoxyalkylene glycol. Among them, the polyoxyalkylene monoalkyl ether, monohydroxy polyester, monohydroxyalkyl sulfonate, dialkylamino alcohol, hydroxycarboxylic acid alkyl ester, dialkylaminoalkylamine, and polyoxyalkylene monoamine are preferred, with the polyoxyalkylene monoalkyl ether being more preferred.

The hydrophilic organic compounds specifically include a compound represented by the following formula (1):

$$R^1(OCHR^2CH_2)_nOH \tag{1}$$

In formula (1), $R^1$ is an alkyl group, cycloalkyl group, or aryl group having 1 to 20 carbon atoms, preferably 1 to 10 carbon atoms, and more preferably 1 to 5 carbons atoms, such as a methyl group, an ethyl group, a propyl group, an isopropyl group, a n-butyl group, a s-butyl group, an isobutyl group, a t-butyl group, a cyclohexyl group, and a phenyl group. $R^1$ is more preferably an alkyl group having 1 to 4 carbon atoms.

$R^2$ is a hydrogen atom or a methyl group.

$R^1$ is more preferably a methyl group and $R^2$ is more preferably a hydrogen atom.

n is a numeral of 1 to 30, and from the viewpoint of favorable hydrophilicity of polycarbodiimide compound (A), n is preferably 7 to 30 and more preferably 8 to 20.

The compound represented by formula (1) may be an aggregate of molecules with different numbers of oxyalkylene groups ($OCHR^2CH_2$). In this case, n is an average value of the number of oxyalkylene groups in each molecule.

Specific examples of compounds represented by formula (1) include polyoxyalkylene monoalkyl ethers, such as polyethylene glycol monomethyl ether, polyethylene glycol monoethyl ether, polypropylene glycol monomethyl ether, polypropylene glycol monoethyl ether, polypropylene glycol monophenyl ether, and a polyoxyalkylene monophenyl ether, and the polyethylene glycol monomethyl ether is particularly preferred from the viewpoints of handleability and availability as well as favorable hydrophilicity of polycarbodiimide compound (A).

Moreover, the hydrophilic organic compound is also preferably a polyoxyalkylene glycol in which $R^1$ is a hydrogen atom or a hydroxyalkyl group in formula (1).

Further, when the hydrophilic organic compound is a polyoxyalkylene monoalkyl ether or a polyoxyalkylene glycol, the hydrophilic organic compound may be a compound in which a polyoxyalkylene group $[(OCHR^2CH_2)_n]$ in formula (1) has a structure of a blocked copolymer or random copolymer of polyethylene glycol and polypropylene glycol, or the like.

Specific examples of monohydroxyalkyl sulfonates include a compound represented by the following formula (2):

$$HOR^3SO_3M \quad (2)$$

In formula (2), $R^3$ is an alkylene group having 1 to 10 carbon atoms, and specific examples thereof include a methylene group, an ethylene group, a propylene group, a tetramethylene group, a pentamethylene group, a hexamethylene group, a heptamethylene group, an octamethylene group, a nonamethylene group, and a decamethylene group.

M is an alkali metal atom and preferably Na or K.

Specific examples of the dialkylamino alcohols include a compound represented by the following formula (3):

$$R^4_2NCH_2CHR^5OH \quad (3)$$

In formula (3), $R^4$ is an alkyl group having 1 to 4 carbon atoms, and specific examples of the alkyl groups include a methyl group, an ethyl group, a propyl group, an isopropyl group, a n-butyl group, a s-butyl group, an isobutyl group, and a t-butyl group.

$R^5$ is a hydrogen atom or an alkyl group having 1 to 4 carbon atoms. Specific examples the alkyl groups include a methyl group, an ethyl group, a propyl group, an isopropyl group, a n-butyl group, a s-butyl group, an isobutyl group, and a t-butyl group.

Specific examples of the dialkylamino alcohols represented by formula (3) include N,N-dimethylisopropanolamine, and N,N-diethylisopropanolamine.

Specific examples of hydroxycarboxylic acid alkyl esters include a compound represented by the following formula (4):

$$R^6OCOCHR^7OH \quad (4)$$

In formula (4), $R^6$ is an alkyl group having 1 to 3 carbon atoms and includes a methyl group, an ethyl group, a propyl group, and an isopropyl group.

$R^7$ is a hydrogen atom or an alkyl group having 1 to 3 carbon atoms, and the alkyl groups include a methyl group, an ethyl group, a propyl group, and an isopropyl group.

Specific examples of hydroxycarboxylic acid alkyl esters represented by formula (4) include methyl glycolate, and methyl lactate.

Specific examples of dialkylaminoalkylamines include a compound represented by the following formula (5):

$$R^8_2—N—R^9—NH_2 \quad (5)$$

In formula (5), $R^8$ is an alkyl group having 1 to 4 carbon atoms, and specific examples thereof include a methyl group, an ethyl group, a propyl group, an isopropyl group, a n-butyl group, a s-butyl group, an isobutyl group, and a t-butyl group.

$R^9$ is an alkylene group having 1 to 4 carbon atoms, and specific examples thereof include a methylene group, an ethylene group, a propylene group, and a tetramethylene group.

Specific examples of polyoxyalkylene monoamines or polyoxyalkylenediamines include a compound represented by the following formula (6):

$$R^{10}(OCHR^{11}CH_2)_nOR^{12} \quad (6)$$

In formula (6), $R^{10}$ is an alkyl group or an aminoalkyl group having 1 to 4 carbon atoms. The alkyl groups specifically include a methyl group, an ethyl group, a propyl group, an isopropyl group, a n-butyl group, a s-butyl group, an isobutyl group, and a t-butyl group.

$R^{11}$ is a hydrogen atom or an alkylene group having 1 to carbon atoms, and specific examples include a methylene group, an ethylene group, a propylene group, and a tetramethylene group.

$R^{12}$ is an aminoalkyl group having 1 to 4 carbon atoms. Specific examples of the aminoalkyl group include an aminomethyl group, an aminoethyl group, an aminopropyl group, an aminoisopropyl group, an amino-n-butyl group, an amino-s-butyl group, an isoaminobutyl group, and an amino-t-butyl group.

For the polyoxyalkylene monoamine or polyoxyalkylenediamine of formula (6) as well, the polyoxyalkylene group $[(OCHR^{11}CH_2)_n]$ in formula (6) may be a compound such as having a structure of a blocked copolymer or random copolymer of polyethylene glycol and polypropylene glycol, or the like, as is the case with the polyoxyalkylene group $[(OCHR^2CH_2)_n]$ in formula (1).

Among the compounds represented by formulae (1) to (6) above, the hydrophilic organic compound is preferably the polyoxyalkylene monoalkyl ether among compounds represented by formula (1), from the viewpoint of favorable hydrophilicity of polycarbodiimide compound (A).

When using a polyoxyalkylene monoalkyl ether having n of 7 to 30 in formula (1) as the hydrophilic organic compound, it is also preferably used in combination with one or more compounds selected from the group consisting of a polyoxyalkylene monoalkyl ether having n less than 7 in formula (1), the dialkylamino alcohol represented by formula (3), and the hydroxycarboxylic acid alkyl ester represented by formula (4).

Polycarbodiimide compound (A) has a structure in which isocyanate groups at both terminals are each capped with a hydrophilic organic compound, and the hydrophilic organic compound for capping an isocyanate group at least one terminal has a molecular weight of 340 or more. The hydrophilic organic compound that is an end-capping agent at least for one terminal and having a molecular weight of 340 or more allows for improvement in hydrophilicity of polycarbodiimide compound (A). From the viewpoint of more favorable hydrophilicity, the end-capping agents at both terminals are preferably hydrophilic organic compounds having a molecular weight of 340 or more.

The molecular weight of the hydrophilic organic compound is preferably 350 or more and more preferably 400 or more from the viewpoint of favorable hydrophilicity of polycarbodiimide compound (A). Moreover, from the viewpoint of maintaining favorable hydrophilicity of the hydrophilic organic compound, the molecular weight is preferably 3200 or less.

A hydrophilic organic compound having a molecular weight of 340 or more is preferably a polyoxyalkylene monoalkyl ether among compounds represented by formula (1). From the viewpoint of the storage stability, a polyoxyalkylene monoalkyl ether having a molecular weight of 450 to 600 is more preferred.

For example, for both terminals of polycarbodiimide compound (A) as well, hydrophilic organic compounds that are end-capping agents, are preferably the same or different polyoxyalkylene monoalkyl ethers, each having n of 7 to 30 in formula (1) and a molecular weight of 340 or more. Moreover, it is also preferred that a hydrophilic organic compound that is an end-capping agent for one terminal of polycarbodiimide compounds (A), is a polyoxyalkylene monoalkyl ether having n of 7 to 30 in formula (1) and a molecular weight of 340 or more, and a hydrophilic organic compound that is an end-capping agent for another terminal, is a polyoxyalkylene monoalkyl ether having m less than 7 in formula (1) and a molecular weight of less than 340.

The above hydrophilic organic compounds may be used singly or in combinations of two or more thereof. Namely, both terminals of polycarbodiimide (A) may be capped with the same hydrophilic organic compound or by different hydrophilic organic compounds. From the viewpoint of facilitation of production, a single hydrophilic organic compound is preferably used.

<Production Method of Polycarbodiimide Compound (A)>

The method for producing polycarbodiimide compound (A) is not particularly limited, and can be carried out by using known production methods. For example, the synthesis methods listed in (a1) to (a3) below are included.

(a1) A method for subjecting a diisocyanate compound (Da) to carbodiimidation reaction in the presence of a catalyst to obtain an isocyanate-terminated polycarbodiimide compound, and then carrying out end-capping reaction by addition of a hydrophilic organic compound (end-capping agent).

(a2) A method for mixing diisocyanate compound (Da) and a hydrophilic organic compound (end-capping agent) to carry out carbodiimidation reaction and end-capping reaction in the presence of a catalyst.

(a3) A method for reacting diisocyanate compound (Da) and a hydrophilic organic compound (end-capping agent) to carry out the end-capping reaction of isocyanate groups, followed by the carbodiimidation reaction in the presence of a catalyst.

Among these synthetic methods, method (a1) or (a3) is preferred from the viewpoint of controlling the degree of polymerization of the carbodiimide groups and production efficiency.

Diisocyanate compound (Da) used in the production of polycarbodiimide compound (A) is not particularly limited, and is any of a chain or alicyclic aliphatic diisocyanate compound, an aromatic diisocyanate compound, or a heterocyclic diisocyanate compound, and these may be used singly or in combinations of two or more thereof.

Examples of the chain aliphatic diisocyanate compounds include tetramethylene diisocyanate, pentamethylene diisocyanate, hexamethylene diisocyanate, dodecamethylene diisocyanate, 2,2,4-trimethylhexamethylene diisocyanate, and lysine diisocyanate.

Examples of the alicyclic diisocyanate compounds include 1,3-bis(isocyanatomethyl)cyclohexane, 1,4-bis(isocyanatomethyl)cyclohexane, 2,2-bis(4-isocyanatocyclohexyl)propane, isophorone diisocyanate, and dicyclohexylmethane-4,4'-diisocyanate.

Examples of the aromatic diisocyanate compounds include tolylene diisocyanate, diphenylmethane diisocyanate, and 2,4,6-triisopropylbenzene-1,3-diyldiisocyanate.

Moreover, the aliphatic diisocyanate compounds including an aromatic ring include, for example, xylylene diisocyanate, 1,3-bis(2-isocyanato-2-propyl)benzene (trivial name: tetramethylxylylene diisocyanate), and the like.

Among them, diisocyanate compound (Da) is preferably a diisocyanate compound having an alicyclic or aromatic ring, from the viewpoint of availability and favorable storage stability of the waterborne resin crosslinking agent. Specifically, diisocyanate compound (Da) is preferably dicyclohexylmethane-4,4'-diisocyanate, isophorone diisocyanate, 4,4'-diphenylmethane diisocyanate, tetramethylxylylene diisocyanate, more preferably tetramethylxylylene diisocyanate and dicyclohexylmethane-4,4'-diisocyanate, and particularly preferably dicyclohexylmethane-4,4'-diisocyanate.

The carbodiimidation reaction is preferably, for example, polymerization (decarboxylation condensation reaction) of diisocyanate compound (Da) in the presence of a carbodiimidation catalyst (see U.S. Pat. No. 2,941,956 B, JP 47-33279 A, J. Org. Chem. 28, p. 2069-2075 (1963), Chemical Review 1981, Vol. 81, No. 4, p. 619-621, and the like).

Examples of the carbodiimidation catalysts include phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, and 3-phosphorene isomers thereof, and the like. Among them, 3-methyl-1-phenyl-2-phosphorene-1-oxide is preferred from the viewpoint of reactivity and availability.

The amount of the carbodiimidation catalyst to be used is usually preferably 0.01 to 10 parts by mass, more preferably 0.05 to 5 parts by mass, and still more preferably 0.07 to 3 part by mass, per 100 parts by mass of diisocyanate compound (Da).

The decarboxylation condensation reaction of diisocyanate compounds can be carried out in a solvent or without a solvent. The solvents used include, for example, alicyclic ethers such as tetrahydrofuran, 1,3-dioxane, dioxolane; aromatic hydrocarbons such as benzene, toluene, xylene, ethylbenzene; halogenated hydrocarbons such as chlorobenzene, dichlorobenzene, trichlorobenzene, perchloroethylene, trichloroethane, and dichloroethane; cyclohexanone, and the like. These may be used singly or in combinations of two or more thereof.

When the reaction is carried out in a solvent, the concentration of diisocyanate compound (Da) is preferable to be 5 to 80% by mass and more preferably 20 to 60% by mass from the viewpoint of uniformity of the reaction system.

The reaction temperature of the decarboxylation condensation reaction is appropriately set depending on moderate reaction acceleration and the degree of polymerization of the carbodiimide groups. The reaction temperature is usually preferably 40 to 250° C., more preferably 90 to 230° C., and still more preferably 100 to 200° C. When the reaction is carried out in a solvent, the temperature is preferably within the range of 40° C. to the boiling point of a solvent.

Moreover, the reaction time is appropriately set according to the reaction temperature and the degree of polymerization of the carbodiimide groups. The reaction time is usually preferably 0.5 to 100 hours, more preferably 1 to 70 hours, and still more preferably 2 to 30 hours.

Further, the reaction is preferably carried out under an inert gas atmosphere such as nitrogen gas or rare gases.

In polycarbodiimide compound (A), the degree of polymerization of carbodiimide groups is not particularly limited, and is preferably 2 to 20, more preferably 3 to 15, and further preferably 5 to 7 from the viewpoint of inhibiting gelation of the waterborne resin crosslinking agent in an aqueous medium.

The "degree of polymerization of carbodiimide groups" herein refers to the number of carbodiimide groups formed by the carbodiimidation reaction.

The end-capping reaction can be carried out, for example, by heating the isocyanate-terminated polycarbodiimide compound and hydrophilic organic compound (end-capping agent) in method (a1) above.

The reaction temperature for the end-capping reaction is appropriately set within the range where the side reaction can be inhibited and the reaction can be accelerated. The reaction temperature is usually preferably 50 to 250° C., more preferably 90 to 220° C., and still more preferably 130 to 200° C.

Moreover, the reaction time is appropriately set within the range where the reaction temperature and side reaction can be inhibited. The reaction time is usually preferably 0.1 to 20 hours, more preferably 0.5 to 10 hours, and still more preferably 0.5 to 5 hours.

For example, polycarbodiimide compound (A) can be obtained by heating the isocyanate-terminated polycarbodiimide compound to 50 to 200° C. and preferably 100 to 180° C., then adding a hydrophilic organic compound and reacting at 80 to 200° C. for 0.5 to 5 hours.

(Polycarbodiimide Compound (B))

Polycarbodiimide compound (B) is a polycarbodiimide compound having, as a structural unit, an isocyanate compound (db) having one cyclohexyl ring or one benzene ring, and has a structure in which the isocyanate groups at both terminals are each capped with an organic compound with a molecular weight of 300 or less.

<Diisocyanate Compound (db)>

Diisocyanate compound (db) that is a structural unit of polycarbodiimide compound (B), has one cyclohexyl ring or one benzene ring.

Therefore, polycarbodiimide compound (B) has a molecular skeleton structure in which one cyclohexyl ring or one benzene ring (hereinafter simply referred to as "ring") and one carbodiimide group are alternately arranged. The intramolecular ring tends to harden the polycarbodiimide compound as compared with a chain hydrocarbon. Presence of such a ring and a carbodiimide group that serves as a crosslinking point for the waterborne resin, which are moderately dispersed within the molecule, is presumed to enables polycarbodiimide compound (B) to contribute to improving hardness of a cured product of the waterborne resin.

It is presumed that a structure including a diisocyanate compound (for example, dicyclohexylmethane diisocyanate, diphenylmethane diisocyanate, naphthylisocyanate, or the like) with two or more rings, even though having many rings, may have a larger distance between carbodiimide groups in the molecular chain of the polycarbodiimide compound thanks to the structure including two or more rings, thereby rather inhibiting the effect of improving the hardness of a cured product of the waterborne resin.

Specific examples of diisocyanate compounds (db) include 1,3-bis(isocyanatomethyl)cyclohexane, 1,4-bis(isocyanatomethyl)cyclohexane, isophorone diisocyanate, tolylene diisocyanate, 2,4,6-triisopropylbenzene-1,3-diyldiisocyanate, xylylene diisocyanate, and tetramethylxylenediisocyanate. These may be used singly or in combinations of two or more thereof.

Among them, diisocyanate compound (db) is preferably a compound having a primary isocyanate group from the viewpoint of facilitation of reaction of a carbodiimide group of polycarbodiimide compound (B) as a crosslinking point for the waterborne resin. Specifically, 1,3-bis(isocyanatomethyl)cyclohexane, 1,4-bis(isocyanatomethyl)cyclohexane, isophorone diisocyanate, xylylene diisocyanate, and the like are preferred, with the isophorone diisocyanate and xylylene diisocyanate being more preferred. The isophorone diisocyanate is particularly preferred.

<Organic Compound Having Molecular Weight of 300 or Less>

Polycarbodiimide compound (B) has a structure in which isocyanate groups at both terminals are each capped with an organic compound having a molecular weight of 300 or less. Namely, the organic compound having a molecular weight of 300 or less is an end-capping agent for both terminals of polycarbodiimide compound (B).

The molecular weight of the organic compound used as the end-capping agent of more than 300 reduces the concentration of carbodiimide groups which serve as crosslinking points for the waterborne resin, in the molecule of polycarbodiimide compound (B), not enabling a favorable crosslinking action to be obtained, from which thereby an effect of improving crosslinking performance such as resulting in hardness and solvent resistance of a cured product of the waterborne resin cannot be sufficiently obtained.

In polycarbodiimide compound (B), the organic compound is an end-capping agent for isocyanate groups, and is not particularly limited as long as the molecular weight is 300 or less, but is preferably, for example, a compound having one functional group that reacts with an isocyanate group.

The functional group is the same as that for the hydrophilic organic compound described above, and includes a hydroxyl group, a primary amino group, a secondary amino group, an epoxy group, an isocyanate group, a carboxy group, and the like.

Polycarbodiimide compound (B) is a polycarbodiimide compound which is less hydrophilic and more hydrophobic than polycarbodiimide compound (A), and the organic compound preferably has one functional group that reacts with an isocyanate group and has no hydrophilic group other than that functional group.

The organic compound is preferably selected from the group consisting of a primary or secondary monoamine, a monoisocyanate, a monool, a monoepoxide and a monocarboxylic acid.

The primary or secondary monoamines (hereinafter simply referred to as "monoamines") include a compound in which a hydrocarbon group having 1 to 18 carbon atoms is bonded to a nitrogen atom of the amino group. Examples of the aforementioned hydrocarbon groups include a methyl group, an ethyl group, a propyl group, a butyl group, a pentyl group, a hexyl group, a heptyl group, an octyl group, a dodecyl group, a cyclopentyl group, a cyclohexyl group, a cyclooctyl group, an adamantly group, an allyl group, a phenyl group, a methyl phenyl group, an ethyl phenyl group, a propylphenyl group, a naphthyl group, and a benzyl group.

Specific examples of the monoamines include methylamine, ethylamine, propylamine, butylamine, pentylamine, hexylamine, octylamine, dodecylamine, diethylamine, dipropylamine, dibutylamine, cyclohexylamine, adamantaneamine, allylamine, aniline, and diphenylamine. Among them, cyclohexylamine is preferred.

The monools include, for example, a compounds in which a hydrocarbon group having 1 to 18 carbon atoms is bonded to the hydroxyl group. The hydrocarbon group is the same as that for the aforementioned monoamines.

Specific examples of the monools include isopropanol, n-octanol, and benzyl alcohol.

Examples of the monoisocyanates include a compound in which a hydrocarbon group having 1 to 18 carbon atoms is bonded to the isocyanate group. The hydrocarbon group is the same as that for the aforementioned monoamines.

Specific examples of the monoisocyanates include butyl isocyanate, pentyl isocyanate, hexyl isocyanate, octyl isocyanate, dodecyl isocyanate, cyclohexyl isocyanate, 1-adamantyl isocyanate, benzyl isocyanate, 2-phenylethyl isocyanate, and diisopropylphenyl isocyanate. Among them, cyclohexyl isocyanate is preferred.

The monoepoxides include, for example, a compound in which a hydrocarbon group having 1 to 18 carbon atoms is bonded to the epoxy group. The hydrocarbon groups is the same as that for the aforementioned monoamines.

Specific examples of the monoepoxides include 1,2-epoxyheptane, 1,2-epoxyhexane, 1,2-epoxydecane, and 1,2-epoxy-5-hexene.

The monocarboxylic acids described above include, for example, a compound in which a hydrocarbon group having 1 to 18 carbon atoms is bonded to the carboxylic acid. The hydrocarbon group is the same as that for the aforementioned monoamines.

Specific examples of the monocarboxylic acids include acetic acid, propionic acid, butanoic acid, pentanoic acid, hexanoic acid, heptanoic acid, octanoic acid, nonanoic acid, decanoic acid, cyclohexanecarboxylic acid, adamantane acetic acid, phenylacetic acid, and benzoic acid.

Moreover, the organic compounds described above are hydrophilic organic compounds represented by any of formulae (1) to (5) above and can be a compound for use, having a molecular weight of 300 or less. Among these hydrophilic organic compounds, the polyoxyalkylene monoalkyl ether represented by formula (1), the dialkylamino alcohol represented by formula (3), or the hydroxycarboxylic acid alkyl ester represented by formula (4) are preferred, and for example, polyethylene glycol monomethyl ether, N,N-diethylisopropanolamine, methyl glycolate, and the like are suitably used.

The aforementioned organic compounds may be used singly or in combinations of two or more thereof. Namely, both terminals of polycarbodiimide (B) may be capped with the same organic compound or by different organic compounds. From the viewpoint of facilitation of production, a single organic compound is preferably used.

<Production Method of Polycarbodiimide Compound (B)>

The method for producing polycarbodiimide compound (B) is not particularly limited and can be carried out by using known production methods. For example, the synthesis methods listed in (b1) to (b3) below are included:

(b1) A method for carrying out carbodiimidation reaction of diisocyanate compound (db) in the presence of a catalyst to obtain an isocyanate-terminated polycarbodiimide compound, followed by adding the organic compound (end-capping agent) to carry out end-capping reaction.

(b2) A method for mixing diisocyanate compound (db) and the organic compound (end-capping agent) and carrying out the carbodiimidation reaction and end-capping reaction in the presence of a catalyst.

(b3) A method for reacting diisocyanate compound (db) and the organic compound (end-capping agent) to carry out the end-capping reaction of isocyanate groups, followed by carrying out the carbodiimidation reaction in the presence of a catalyst.

Among these synthetic methods, method (b2) or (b3) is preferred from the viewpoint of controlling the degree of polymerization of the carbodiimide groups and production efficiency.

The carbodiimidation reaction and end-capping reaction can be carried out in the same manner as in the synthetic method of polycarbodiimide compound (A). The reaction conditions are appropriately adjusted depending on the type of raw material compound, due to different reactivities thereof.

In polycarbodiimide compound (B), the degree of polymerization of the carbodiimide groups is not particularly limited, and is preferably 2 to 20, more preferably 3 to 15, and still more preferably 5 to 7 from the viewpoint of favorable storage stability or the like in a case where the waterborne resin crosslinking agent is co-present with an aqueous medium or a waterborne resin.

(Contents of Polycarbodiimide Compound (A) and Polycarbodiimide Compound (B))

The waterborne resin crosslinking agent has a content of polycarbodiimide compound (A) of 5 to 90 parts by mass, preferably 15 to 85 parts by mass, more preferably 20 to 80 parts by mass, and still more preferably 30 to 70 parts by mass, in 100 parts by mass of polycarbodiimide compound (A) and polycarbodiimide compound (B) in total.

In the waterborne resin crosslinking agent, polycarbodiimide compound (A) is a polycarbodiimide compound with high hydrophilicity, and polycarbodiimide compound (B) is a polycarbodiimide compound with lower hydrophilicity and higher hydrophobicity. Therefore, the waterborne resin crosslinking agent is considered to be in a form in which polycarbodiimide compound (A) disperses polycarbodiimide compound (B) in an aqueous medium. Polycarbodiimide compound (A) contributes to the affinity with an aqueous medium, playing an action of facilitating the uniform addition of the waterborne resin crosslinking agent to the waterborne resin, while polycarbodiimide compound (B) can exert stronger crosslinking action than polycarbodiimide compound (A) for the waterborne resin. Therefore, the waterborne resin crosslinking agent described above is presumed to contemplate improvements in hardness and solvent resistance of a cured product of the waterborne resin.

The content of polycarbodiimide compound (A) in 100 parts by mass of polycarbodiimide compound (A) and polycarbodiimide compound (B) in total being less than 5 parts by mass, renders the affinity of the waterborne resin crosslinking agent with an aqueous medium insufficient, does not enable favorable storage stability to be obtained when co-present with the aqueous medium or waterborne resin, and does not enable the crosslinking action on the waterborne resin to be fully exerted.

The content exceeding 90 parts by mass, on the other hand, facilitates an increase of the viscosity and gelation when co-present with the aqueous medium and waterborne resin, because the affinity of the waterborne resin crosslinking agent with the aqueous medium is too large, thereby not enabling favorable storage stability to be obtained. In this case as well, the crosslinking action on the waterborne resin is not fully exerted.

Other Components

In addition to polycarbodiimide compound (A) and polycarbodiimide compound (B), the waterborne resin crosslinking agent may include a solvent and an additive such as an antioxidant, a UV absorber, and a defoamer, to the extent that the effects of the present invention are not impaired. In this case, from the viewpoint of ensuring that the crosslinking action of the waterborne resin crosslinking agent is fully exerted, the total content of polycarbodiimide compound (A) and polycarbodiimide compound (B) in the waterborne resin crosslinking agent is preferably 85% by mass or more, more preferably 90% by mass or more, and still more preferably 95% by mass.

(Production Method of Waterborne Resin Crosslinking Agent)

The waterborne resin crosslinking agent can be produced by stirring and mixing polycarbodiimide compound (A), polycarbodiimide compound (B), and other components such as an additive, if necessary. An aqueous medium may also be used upon mixing these components, and the waterborne resin crosslinking agent may be preliminarily produced as a waterborne resin crosslinking agent-containing liquid as described below.

The method for stirring and mixing to obtain the waterborne resin crosslinking agent is not particularly limited, and can be carried out by known methods using, for example, rotating blades or a magnetic stirrer.

Conditions such as temperature and time upon mixing vary depending on the types of polycarbodiimide compound (A) and polycarbodiimide compound (B), and the like, and from the viewpoint of efficient and uniform mixing, for example, mixing at 60 to 200° C. for 1 to 48 hours is preferred.

[Waterborne Resin Crosslinking Agent-Containing Liquid]

The waterborne resin crosslinking agent-containing liquid of the present invention includes the waterborne resin crosslinking agent and the aqueous medium. Including the waterborne resin crosslinking agent in a liquid including it, facilitates uniform addition and mixing for a waterborne resin which is to undergo crosslinking reaction, rendering the liquid excellent in handleability.

The concentration of the waterborne resin crosslinking agent in the waterborne resin crosslinking agent-containing liquid can be appropriately set from the viewpoints of handleability upon uniform addition and mixing for the waterborne resin, efficiency of the crosslinking reaction, and the like, however, the concentration is preferably 10 to 100% by mass, more preferably 20 to 80% by mass, and still more preferably 30 to 50% by mass.

(Aqueous Medium)

The aqueous medium for use is a medium capable of uniformly dissolving or dispersing each of the components in the waterborne resin crosslinking agent, and includes hydrophilic solvents among water and alcohols, ethers, ketones, esters, and the like. These may be used singly or in combinations of two or more thereof. Among them, water or a mixed solvent of water and a hydrophilic solvent is preferred, and single water is preferred from the viewpoint of environmental considerations and cost.

Alcohols include, for example, methanol, isopropanol, n-butanol, 2-ethylhexyl alcohol, ethylene glycol, propylene glycol, and the like. Ethers include, for example, ethylene glycol monoethyl ether, ethylene glycol monobutyl ether, ethylene glycol monohexyl ether, propylene glycol monoethyl ether, 3-methoxy-3-methylbutanol, diethylene glycol monomethyl ether, diethylene glycol monoethyl ether, tetrahydrofuran, and the like. Ketones include, for example, methyl isobutyl ketone, cyclohexanone, isophorone, acetylacetone, and the like. Esters include, for example, ethylene glycol monoethyl ether acetate, ethylene glycol monobutyl ether acetate, and the like.

(Surfactant)

The waterborne resin crosslinking agent-containing liquid may include a surfactant. Using the surfactant allows polycarbodiimide compound (A) and polycarbodiimide compound (B) to be uniformly dissolved or dispersed in the aqueous medium, enabling further improvement in storage stability of the waterborne resin crosslinking agent-containing liquid. The surfactant can also contribute to improving hardness and solvent resistance of a cured product of the waterborne resin.

When the surfactant is included in the waterborne resin crosslinking agent-containing liquid, the content of the surfactant is preferably 0.1 to 20 parts by mass, more preferably 0.2 to 10 parts by mass, and still more preferably 0.3 to 8 parts by mass, per 100 parts by mass in total of polycarbodiimide compound (A) and polycarbodiimide compound (B), from the viewpoint of an effect of sufficiently improving the storage stability of the waterborne resin crosslinking agent-containing liquid and a waterborne resin composition therewith, and an effect of improving hardness and the solvent resistance of the cured product of the waterborne resin, and the like.

From the viewpoint of the storage stability of the waterborne resin crosslinking agent-containing liquid and the waterborne resin composition therewith as well as compatibility with the waterborne resin or the like, the surfactant is preferably an anionic surfactant or a nonionic surfactant and more preferably an anionic surfactant is used. These may be used singly or in combinations of two or more thereof.

Examples of the anionic surfactants include alkylbenzenesulfonates such as sodium dodecylbenzenesulfonate, alkylsulfates such as sodium dodecylsulfate and sodium laurylsulfate, sodium N-cocoyl methyl taurate, sodium di-2-ethylhexyl sulfosuccinate, sodium 2-ethylhexylsulfate, and sodium α-sulfo fatty acid methyl ester. Among these, sodium dodecylbenzenesulfonate is suitably used.

Examples of the nonionic surfactants include polyoxyethylene-2-ethylhexyl ether, polyethylene glycol monomethyl ether, polyoxyethylene isodecyl ether. The molecular weights of these nonionic surfactants are preferably 100 to 2000, more preferably 100 to 1000, and still more preferably 300 to 1000, from the viewpoint of facilitation of addition and mixing.

(Other Components)

The waterborne resin crosslinking agent-containing liquid includes the waterborne resin crosslinking agent, the aqueous medium, and the surfactant added, if necessary, and as an optional component other than these compounds, a solvent and an additive such as an antioxidant, a UV absorber, a defoamer, or the like may further be added, which are aside from the solvent and the additive in the waterborne resin crosslinking agent, to the extent that the effects of the present invention are not impaired.

(Production Method of Waterborne Resin Crosslinking Agent-Containing Liquid)

The waterborne resin crosslinking agent-containing liquid can be produced by mixing the waterborne resin crosslinking agent, aqueous medium, the surfactant, if necessary, and further the additive as the other components and the like. The method of stirring and mixing is not particularly limited, and can be carried out by known methods using, for example, rotating blades or a magnetic stirrer.

Conditions such as temperature, time and the like upon mixing vary depending on the composition of the waterborne resin crosslinking agent and the type of aqueous medium, however, from the viewpoint of efficient and uniform mixing, for example, when mixing the waterborne resin crosslinking agent and aqueous medium, they are preferably stirred and mixed at 20 to 100° C. for 0.5 to 5 hours.

[Waterborne Resin Composition]

The waterborne resin composition of the present invention includes the waterborne resin crosslinking agent and the waterborne resin described above. The waterborne resin crosslinking agent of the present invention described above has excellent storage stability when co-present with the waterborne resin, and therefore, the waterborne resin composition can favorably undergo crosslinking reaction by heating or the like even after an elapse of time, such as a long period of time after the production, at least about a week. Moreover, using the waterborne resin composition allows for a cured product of the waterborne resin, providing high hardness to a coating film and having favorable solvent resistance.

(Waterborne Resin)

The waterborne resin is a water soluble or water dispersible resin. The waterborne resin can be crosslinked by the waterborne resin crosslinking agent, and in particular, it is preferably a resin having a crosslinkable group that can be crosslinked by a carbodiimide group.

Specifically the waterborne resin preferably has a functional group as a crosslinkable group, selected from the group consisting of a carboxy group, an amino group, and a hydroxyl group, and more preferably an alcoholic hydroxyl group and/or a carboxy group. The aforementioned waterborne resins include, for example, waterborne resins having such crosslinkable groups, such as a polyester resin, an acrylic resin, a polyurethane resin, an epoxy resin, a styrene-acrylic resin, a melamine resin, a polyolefin resin, and a fluororesin. These may be used singly or in combinations of two more thereof. Among them, the polyester resin, acrylic resin, and polyurethane resin are particularly suitable for use.

(Waterborne Resin Crosslinking Agent)

The content of the waterborne resin crosslinking agent in the waterborne resin composition may be appropriately determined according to the type of waterborne resin, the physical properties required for a cured product of the waterborne resin, and the like, and from the viewpoint of balance of crosslinking reactivity and cost, the content is preferably 0.5 to 40 parts by mass, more preferably 1 to 30 parts by mass, and still more preferably 1.5 to 20 parts by mass, per 100 parts by mass of the waterborne resin.

(Other Components) In addition to the waterborne resin crosslinking agent and waterborne resin, the waterborne resin composition may include other components to the extent that the effects of the present invention are not impaired. Specifically, a solvent and various additives, if necessary, such as a colorant, a filler, a dispersant, a plasticizer, a thickener, a UV absorber, and an antioxidant, which are aside from the solvent and additive in the waterborne resin crosslinking agent or the waterborne resin crosslinking agent-containing liquid, may be further added, depending on the purpose of use or application.

(Production Method of Waterborne Resin Composition)

The waterborne resin composition can be produced by adding the waterborne resin crosslinking agent, the waterborne resin, the other components described above, and the like in any order, and stirring and mixing them. The method of stirring and mixing is not particularly limited, and can be carried out by known methods using, for example, rotating blades or a magnetic stirrer.

Conditions such as temperature, time, and the like upon mixing vary depending on the composition of the waterborne resin crosslinking agent, the type of waterborne resin, and the like, however, from the viewpoint of efficient and uniform mixing, the mixing temperature is preferably 0 to 100° C. and more preferably 10 to 50° C. From the viewpoint of reactivity and mixing efficiency of the mixture of the waterborne resin crosslinking agent, the waterborne resin, and the like, the temperature is more preferably 20 to 30° C. The mixing time is preferably 0.1 to 2 hours and more preferably 0.3 to 1 hour.

The waterborne resin composition may be produced by mixing the waterborne resin composition with the waterborne resin as a waterborne resin crosslinking agent-containing liquid as described above, from the viewpoint of uniform mixing with the waterborne resin and facilitation of handleability.

(Cured Product of Waterborne Resin Composition)

The waterborne resin composition undergoes crosslinking reaction by heating or the like to produce a cured product of a waterborne resin (waterborne resin composition). The cured product can be formed into a cured film by applying the waterborne resin composition to a surface of a predetermined base material, followed by heating for crosslinking reaction.

A coating method of the waterborne resin composition that is a known method can be employed, such as brush coating, tampo coating, spray coating, hot spray coating, airless spray coating, roller coating, curtain flow coating, flow coating, dip coating, and knife-edge coating.

The heating method is not particularly limited, and for example, an electric heating furnace, an infrared heating furnace, a high-frequency heating furnace, or the like can be used. The heating temperature is appropriately set according to the composition of the waterborne resin crosslinking agent, the type of waterborne resin, and the like from the viewpoint of promoting the crosslinking reaction within the range where the waterborne resin composition does not discolor or thermally decompose.

Using the waterborne resin composition allows for a cured product of the waterborne resin, providing high hardness to a coating film and having favorable solvent resistance, from which the waterborne resin composition can be suitably used for various applications such as a paint, an ink, a fiber treatment agent, an adhesive, a pressure-sensitive adhesive, a coating agent, a molded product, and in particular the composition is suitable for an adhesive, a fiber treatment agent, a coating agent, an ink, a paint, and a pressure-sensitive adhesive.

For example, applying the waterborne resin composition as paints also enables a cured film (coating film) of the waterborne resin having high hardness and excellent solvent resistance and an article including such a cured film formed on any base material as well to be obtained. Note, however, the base material may be any inorganic material or organic material, for example, metals, ceramics, resins, wood, cloths, fibers, and the like.

Moreover, the waterborne resin composition can also be suitably applied for wet-on-wet coating. In the case of the wet-on-wet system, a coating film formed of the waterborne resin composition is less likely to cause blurring or poor adhesion between laminated coating films due to its accelerated crosslinking reaction, which enables a cured film with high hardness and favorable interlayer adhesion to be formed efficiently.

Further, the waterborne resin composition can also exhibit in addition thereto, various other physical properties based on its excellent crosslinkability. For example, an article including a cured film formed on a base material can be applied to applications requiring high tensile strength, excellent heat resistance, durability, adhesiveness, close adhesiveness, chipping resistance, scratch resistance, and compatibility. Specifically, the waterborne resin composition can be suitably applied in automobiles, construction, and heavy-duty anti-corrosion coating, food packaging, healthcare, and the like.

EXAMPLES

The present invention will be described in detail below by way of Examples. However, the present invention is not limited thereby.

[Synthesis of Polycarbodiimide Compound]

First, each polycarbodiimide compound used in the following Examples and Comparative Examples was synthesized.

{Raw Material Compounds}

The details of the raw material compounds used in the following Synthesis Examples are as follows. It is noted that the molecular weight as used herein is calculated or a catalog value.

<Diisocyanate Compounds>

HMDI: Dicyclohexylmethane-4,4'-diisocyanate (molecular weight 262.35, manufactured by Tokyo Chemical Industry Co., Ltd.)

TMXDI: Tetramethylxylylenediisocyanate (molecular weight 244.29, manufactured by Tokyo Chemical Industry Co., Ltd.)

IPDI: Isophorone diisocyanate (molecular weight 222.29, manufactured by Tokyo Chemical Industry Co., Ltd.)

HDI: Hexamethylene diisocyanate (molecular weight 168.19, manufactured by Tokyo Chemical Industry Co., Ltd.)

XDI: m-Xylylene diisocyanate (molecular weight 188.19, manufactured by Tokyo Chemical Industry Co., Ltd.)

TDI: Tolylene diisocyanate (molecular weight 174.16, manufactured by Tokyo Chemical Industry Co., Ltd.)

MDI: 4,4'-Diphenylmethane diisocyanate (molecular weight 250.25, manufactured by Tokyo Chemical Industry Co., Ltd.)

<End-Capping Agents>

MP550: Polyethylene glycol monomethyl ether 550 (molecular weight 525-575, manufactured by Tokyo Chemical Industry Co., Ltd.)

MP208: Tetraethylene glycol monomethyl ether (molecular weight 208.25, manufactured by Tokyo Chemical Industry Co., Ltd.)

CHI: Cyclohexyl isocyanate (molecular weight 125.17, manufactured by Tokyo Chemical Industry Co., Ltd.)

C8: N-octanol (molecular weight 130.23, manufactured by Tokyo Chemical Industry Co., Ltd.)

BzOH: Benzyl alcohol (molecular weight 108.14, manufactured by Tokyo Chemical Industry Co., Ltd.)

IPA: Isopropanol (molecular weight 60.10, manufactured by Tokyo Chemical Industry Co., Ltd.)

GM: Methyl glycolate (molecular weight 90.08, manufactured by Tokyo Chemical Industry Co., Ltd.)

AA: N,N-Diethylisopropanolamine (molecular weight 131.22, manufactured by Tokyo Chemical Industry Co., Ltd.)

PEG400: Polyethylene glycol 400 (molecular weight 380 to 420, manufactured by Tokyo Chemical Industry Co., Ltd.)

ED-900: Polyalkylene glycol diamine; "Jeffamine® ED-900"; molecular weight 900, manufactured by Huntsman Corporation.

M-1000: Polyalkylene glycol monoamine; "Jeffamine® M-1000", molecular weight 1000, manufactured by Huntsman Corporation.

CHA: Cyclohexylamine (molecular weight 99.18, manufactured by Tokyo Chemical Industry Co., Ltd.)

<Carbodiimidation Catalyst>

3-Methyl-1-phenyl-2-phosphorene-1-oxide (manufactured by Tokyo Chemical Industry Co., Ltd.)

<Solvents>

Cyclohexanone (manufactured by Tokyo Chemical Industry Co., Ltd.)

{Analysis Apparatus and Method}

The following apparatus and methods were used for each analysis in the following Synthesis Examples.

<Infrared Absorption (IR) Spectrum>

Measurement apparatus: "FTIR-8200PC", manufactured by Shimadzu Corporation

<Degree of Polymerization>

(1) In a case where a polycarbodiimide compound is synthesized by simultaneously compounding a diisocyanate compound and an end-capping agent, the degree of polymerization of carbodiimide groups is a value based on calculation.

(2) In a case where an isocyanate-terminated polycarbodiimide is synthesized by the polycarbodiimidation reaction of a diisocyanate compound, followed by the capping reaction of the terminal isocyanate group using an end-capping agent to synthesize a ploycarbodiimide compound, the polymerization degree of the carbodiimide groups for the isocyanate-terminated polycarbodiimide is calculated by a potentiometric titration method (apparatus used: an automatic titrator "COM-900", manufactured by Hiranuma Sangyo Co., Ltd.). Specifically, an isocyanate-terminated polycarbodiimide obtained by carbodiimidation reaction was mixed with a toluene solution of di-n-butylamine at a known concentration to react the terminal isocyanate groups with di-n-butylamine, and the remaining di-n-butylamine underwent neutral titration with hydrochloric acid standard solution to determine the amount of the remaining isocyanate groups (the amount of terminal NCO [% by mass]). The degree of polymerization of the carbodiimide group was calculated from the amount of the terminal NCO.

Synthesis Example 1-1

A reaction vessel with a reflux tube and a stirrer was charged with 100 parts by mass of HMDI and 0.5 parts by mass of a carbodiimidation catalyst, and the mixture was stirred at 170° C. for 18 hours under a nitrogen flow to obtain an isocyanate-terminated polycarbodiimide compound having isocyanate groups at both terminals (amount of terminal isocyanate groups: 5.34% by mass). IR spectrum measurement confirmed an absorption peak due to carbodiimide groups at a wavenumber of approximately 2150 $cm^{-1}$.

85.6 parts by mass of the isocyanate-terminated polycarbodiimide compound obtained was dissolved at 150° C., and thereto was added 59.9 parts by mass of MP550 (the same molar equivalent as the terminal isocyanate groups of the isocyanate-terminated polycarbodiimide compound) as the end-capping compound, and the mixture was heated to 180° C. and reacted for 2 hours under stirring. Following confirmation of disappearance of absorption peak of the isocyanate groups at a wavenumber from 2200 to 2300 $cm^{-1}$ by IR spectrum measurement, the reaction product was removed from the reaction vessel and cooled to room temperature (25° C.) to obtain a polycarbodiimide compound (A1) (Mn (theoretical value of number-average molecular weight; the same applies hereinafter.):2672, the number of carbodiimide groups per molecule: 6).

Synthesis Example 1-2

A reaction vessel with a reflux tube and a stirrer was charged with 100 parts by mass of HMDI and 0.5 parts by mass of a carbodiimidation catalyst, and the mixture was stirred at 170° C. for 6 hours under a nitrogen flow to obtain an isocyanate-terminated polycarbodiimide compound having isocyanate groups at both terminals (amount of terminal isocyanate groups: 9.16% by mass). IR spectrum measurement confirmed an absorption peak due to carbodiimide groups at the wavenumber of approximately 2150 $cm^{-1}$.

87.4 parts by mass of the isocyanate-terminated polycarbodiimide compound obtained was dissolved at 150° C., and thereto was added 104.8 parts by mass of MP550 (the same molar equivalent as the terminal isocyanate groups of the isocyanate-terminated polycarbodiimide compound) as the end-capping compound, and the mixture was heated to 180° C. and reacted for 2 hours under stirring. Following confirmation of disappearance of absorption peak of the isocyanate groups at a wavenumber from 2200 to 2300 $cm^{-1}$ by IR spectrum measurement, the reaction product was removed from the reaction vessel and cooled to room temperature (25° C.) to obtain a polycarbodiimide compound (A2) (Mn: 2017, the number of carbodiimide groups per molecule: 3).

Synthesis Example 1-3

A reaction vessel with a reflux tube and a stirrer was charged with 100 parts by mass of HMDI and 0.5 parts by mass of a carbodiimidation catalyst, and the mixture was stirred at 170° C. for 24 hours under a nitrogen flow to obtain an isocyanate-terminated polycarbodiimide compound having isocyanate groups at both terminals (amount of terminal isocyanate groups: 3.77% by mass). IR spectrum measurement confirmed an absorption peak due to carbodiimide groups at the wavenumber of approximately 2150 $cm^{-1}$.

84.9 parts by mass of the isocyanate-terminated polycarbodiimide compound obtained was dissolved at 150° C., and thereto was added 41.9 parts by mass of MP550 (the same molar equivalent as the terminal isocyanate groups of the isocyanate-terminated polycarbodiimide compound) as the end-capping compound, and the mixture was heated to 180° C. and reacted for 2 hours under stirring. Following confirmation of disappearance of absorption peak of the isocyanate groups at a wavenumber from 2200 to 2300 $cm^{-1}$ by IR spectrum measurement, the reaction product was removed from the reaction vessel and cooled to room temperature (25° C.) to obtain a polycarbodiimide compound (A3) (Mn: 3328, the number of carbodiimide groups per molecule: 9).

Synthesis Example 1-4

A reaction vessel with a reflux tube and a stirrer was charged with 100 parts by mass of TMXDI and 2.0 parts by mass of a carbodiimidation catalyst, and the mixture was stirred and mixed at 170° C. for 18 hours under a nitrogen flow to carry out carbodiimidation reaction to obtain an isocyanate-terminated polycarbodiimide compound having isocyanate groups at both terminals (amount of terminal isocyanate groups: 5.81% by mass). IR spectrum measurement confirmed an absorption peak due to carbodiimide groups at the wavenumber of approximately 2150 $cm^{-1}$.

84.6 parts by mass of the isocyanate-terminated polycarbodiimide compound obtained was dissolved at 150° C., and thereto was added 64.3 parts by mass of MP550 (the same molar equivalent as the terminal isocyanate groups of the isocyanate-terminated polycarbodiimide compound) as the end-capping agent, and the mixture was heated to 180° C. and reacted for 2 hours under stirring. Following confirmation of disappearance of absorption peak of the isocyanate groups at a wavenumber from 2200 to 2300 $cm^{-1}$ by IR spectrum measurement, the reaction product was removed from the reaction vessel and cooled to room temperature (25° C.) to obtain a polycarbodiimide compound (A4) (Mn: 2564, the number of carbodiimide groups per molecule: 6).

Synthesis Examples 1-5 to 1-9

Polycarbodiimide compounds (A5) to (A9) were obtained in the same manner as in Synthesis Example 1-1, respectively, except that MP550 was changed to MP208 (11.3 parts by mass) and MP550 (30.0 parts by mass) for Synthesis Example 1-5, to AA (7.2 parts by mass) and MP550 (30.0 parts by mass) for Synthesis Example 1-6, to PEG400 (43.6 parts by mass) for Synthesis Example 1-7, to ED-900 (98.0 parts by mass) for Synthesis Example 1-8, or to M-1000

(108.9 parts by mass) for Synthesis Example 1-9, respectively, in Synthesis Example 1-1.

Synthesis Example 1-10

A reaction vessel with a reflux tube and a stirrer was charged with 100 parts by mass of MDI, 62.8 parts by mass of MP550, and 250 parts by mass of cyclohexanone as the solvent, and the mixture was reacted by stirring and mixing it at 100° C. for 2 hours under a nitrogen flow followed by cooling to the temperature in the vessel of 25° C. 0.5 parts by mass of a carbodiimidation catalyst was added, and the mixture was heated again and reacted by stirring and mixing it at 100° C. for 6 hours. In IR spectrum measurement, the ratio of the height of the absorption peak of the isocyanate groups (NCO) at a wavenumber from 2200 to 2300 $cm^{-1}$ to that of the absorption peak of the carbodiimide groups (NCN) at a wavenumber from 2000 to 2200 $cm^{-1}$ ([NCO]/[NCN]: the ratio of the heights that was corrected for the base line. The same applies hereinafter.) was confirmed to be reduced to 0.05 or less.

The solvent was then distilled off under vacuum, the reaction product was removed from the reaction vessel and cooled to room temperature (25° C.) to obtain a polycarbodiimide compound (A10) (Mn: 2588, the number of carbodiimide groups in one molecule: 6).

Synthesis Example 1-11

A reaction vessel with a reflux tube and a stirrer was charged with 100 parts by mass of IPDI, and 70.7 parts by mass of MP550, and the mixture was reacted by stirring and mixing it at 150° C. for 2 hours under a nitrogen flow followed by cooling to the temperature in the vessel of 25° C. 2.0 parts by mass of a carbodiimidation catalyst was added, and the mixture was heated again and reacted by stirring and mixing it at 150° C. for 12 hours. In IR spectrum measurement, the ratio of the height of the absorption peak of the isocyanate groups at a wavenumber from 2200 to 2300 $cm^{-1}$ to that of the absorption peak of the carbodiimide groups at a wavenumber from 2000 to 2200 $cm^{-1}$ was confirmed to be reduced to 0.05 or less.

The reaction product was removed from the reaction vessel and cooled to room temperature (25° C.) to obtain a polycarbodiimide compound (A11) (Mn: 2392, the number of carbodiimide groups in one molecule: 6).

Synthesis Example 1-12

A reaction vessel with a reflux tube and a stirrer was charged with 100 parts by mass of XDI, 83.5 parts by mass of MP550, and 300 parts by mass of cyclohexanone as the solvent, and the mixture was reacted by stirring and mixing it at 150° C. for 2 hours under a nitrogen flow followed by cooling to the temperature in the vessel of 25° C. 2.0 parts by mass of a carbodiimidation catalyst was added, and the mixture was heated again, and reacted by stirring and mixing it at 150° C. for 12 hours. In IR spectrum measurement, the ratio of the height of the absorption peak of the isocyanate groups at wavenumber from 2200 to 2300 $cm^{-1}$ to that of the absorption peak of the carbodiimide groups at wavenumber from 2000 to 2200 $cm^{-1}$ was confirmed to be reduced to 0.05 or less.

The solvent was then distilled off under vacuum and the reaction product was removed from the reaction vessel and cooled to room temperature (25° C.) to obtain a polycarbodiimide compound (A12) (Mn: 2153, the number of carbodiimide groups in one molecule: 6).

Synthesis Example 1-13

A reaction vessel with a reflux tube and a stirrer was charged with 100 parts by mass of TDI, 90.2 parts by mass of MP550, and 280 parts by mass of cyclohexanone as the solvent, and the mixture was reacted by stirring and mixing it at 100° C. for 2 hours under a nitrogen flow followed by cooling to the temperature in the vessel of 25° C. 0.5 parts by mass of a carbodiimidation catalyst was added, and the mixture was heated again and reacted by stirring and mixing it at 100° C. for 12 hours. In IR spectrum measurement, the ratio of the height of the absorption peak of the isocyanate groups at a wavenumber from 2200 to 2300 $cm^{-1}$ to that of the absorption peak of the carbodiimide groups at a wavenumber from 2000 to 2200 $cm^{-1}$ was confirmed to be reduced to 0.05 or less.

The solvent was then distilled off under vacuum and the reaction product was removed from the reaction vessel and cooled to room temperature (25° C.) to obtain a polycarbodiimide compound (A13) (Mn: 2055, the number of carbodiimide groups in one molecule: 6).

Synthesis Example 2-1

A reaction vessel with a reflux tube and a stirrer was charged with 100 parts by mass of IPDI, 28. 2 parts by mass of CHI, and 2.6 parts by mass of a carbodiimidation catalyst, and the mixture was reacted by stirring and mixing it at 150° C. for 24 hours under a nitrogen flow, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The reaction product was then removed from the reaction vessel and cooled to room temperature (25° C.) to obtain a polycarbodiimide compound (B1) (Mn: 920, the number of carbodiimide groups per molecule: 5).

Synthesis Example 2-2

A reaction vessel with a reflux tube and a stirrer was charged with 100 parts by mass of IPDI and 19.5 parts by mass of C8, and the mixture was reacted by stirring and mixing it at 150° C. for 2 hours under a nitrogen flow followed by cooling to the temperature in the vessel, 25° C. Two parts by mass of a carbodiimidation catalyst were added and the mixture was heated again followed by reacted by stirring and mixing it at 150° C. for 24 hours, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The reaction product was then removed from the reaction vessel and cooled to room temperature (25° C.) to obtain a polycarbodiimide compound (B2) (Mn: 1374, the number of carbodiimide groups per molecule: 5).

Synthesis Examples 2-3 to 2-6

Polycarbodiimide compounds (B3) to (B6) were obtained in the same manner as in Synthesis Example 2-2, respectively, except that C8 was changed to BzOH (16.2 parts by mass) for Synthesis Example 2-3, to IPA (9.0 parts by mass) for Synthesis Example 2-4, to GM (6.8 parts by mass) and MP208 (15.6 parts by mass) for Synthesis Example 2-5, or to AA (9.8 parts by mass) and CHA (7.4 parts by mass) for Synthesis Example 2-6, in Synthesis Example 2-2.

Synthesis Example 2-7

A reaction vessel with a reflux tube and a stirrer was charged with 100 parts by mass of XDI, 33.3 parts by mass of CHI, 2.7 parts by mass of a carbodiimidation catalyst, and 200 pars by mass of cyclohexanone as the solvent, and the mixture was reacted by stirring and mixing it at 150° C. for 12 hours under a nitrogen flow, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The solvent was then distilled off under vacuum, the reaction product was removed from the reaction vessel and cooled to room temperature (25° C.) to obtain a polycarbodiimide compound (B7) (Mn: 783, the number of carbodiimide groups in one molecule: 5).

Synthesis Example 2-8

A reaction vessel with a reflux tube and a stirrer was charged with 100 parts by mass of TDI, 35.9 parts by mass of CHI, 0.7 parts by mass of a carbodiimidation catalyst, and 200 pars by mass of cyclohexanone as the solvent, and the mixture was reacted by stirring and mixing it at 150° C. for 12 hours under a nitrogen flow, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The solvent was then distilled off under vacuum, the reaction product was removed from the reaction vessel and cooled to room temperature (25° C.) to obtain a polycarbodiimide compound (B8) (Mn: 727, the number of carbodiimide groups in one molecule: 5).

Synthesis Example 2-9

A reaction vessel with a reflux tube and a stirrer was charged with 100 parts by mass of TMXDI and 1.0 parts by mass of a carbodiimidation catalyst, and the mixture was stirred and mixed at 170° C. for 18 hours under a nitrogen flow to carry out carbodiimidation reaction to obtain an isocyanate-terminated polycarbodiimide compound having isocyanate groups at both terminals (amount of terminal isocyanate groups: 6.74% by mass). IR spectrum measurement confirmed an absorption peak due to carbodiimide groups at the wavenumber of approximately 2150 $cm^{-1}$.

85.0 parts by mass of the isocyanate-terminated polycarbodiimide compound obtained were dissolved at 150° C., and thereto was added 17.8 parts by mass of C8 (the same molar equivalent as the terminal isocyanate groups of the isocyanate-terminated polycarbodiimide compound) as the end-capping agent, and the mixture was heated to 180° C. and reacted for 2 hours under stirring. Following confirmation of disappearance of absorption peak of the isocyanate groups at a wavenumber from 2200 to 2300 $cm^{-1}$ by IR spectrum measurement, the reaction product was removed from the reaction vessel and cooled to room temperature (25° C.) to obtain a polycarbodiimide compound (B9) (Mn: 1506, the number of carbodiimide groups per molecule: 5).

Synthesis Example 2-10

A reaction vessel with a reflux tube and a stirrer was charged with 100 parts by mass of HMDI, 23.9 parts by mass of CHI, and 0.6 parts by mass of a carbodiimidation catalyst, and the mixture was reacted by stirring it at 180° C. for 47 hours under a nitrogen flow, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The reaction product was then removed from the reaction vessel and cooled to room temperature (25° C.) to obtain a polycarbodiimide compound (B'1) (Mn: 1080, the number of carbodiimide groups per molecule: 5).

Synthesis Example 2-11

A reaction vessel with a reflux tube and a stirrer was charged with 100 parts by mass of MDI, 25.0 parts by mass of CHI, 0.6 parts by mass of a carbodiimidation catalyst, and 150 pars by mass of cyclohexanone as the solvent, and the mixture was reacted by stirring and mixing it at 120° C. for 12 hours under a nitrogen flow, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The solvent was then distilled off under vacuum, the reaction product was removed from the reaction vessel and cooled to room temperature (25° C.) to obtain a polycarbodiimide compound (B'2) (Mn: 1031, the number of carbodiimide groups in one molecule: 5).

Synthesis Example 2-12

A reaction vessel with a reflux tube and a stirrer was charged with 100 parts by mass of HDI, 37.2 parts by mass of CHI, 2.7 parts by mass of a carbodiimidation catalyst, and 200 pars by mass of cyclohexanone as the solvent, and the mixture was reacted by stirring and mixing it at 150° C. for 12 hours under a nitrogen flow, and in IR spectrum measurement, the ratio of the height of the absorption peak of isocyanate groups at a wavenumber from 2200 to 2300 $cm^{-1}$ to that of the absorption peak of carbodiimide groups at a wavenumber from 2000 to 2200 $cm^{-1}$ was confirmed to be reduced to 0.05 or less.

The solvent was then distilled off under vacuum, the reaction product was removed from the reaction vessel and cooled to room temperature (25° C.) to obtain a polycarbodiimide compound (B'3) (Mn: 703, the number of carbodiimide groups in one molecule: 5).

[Preparation of Waterborne Resin Crosslinking Agent-Containing Liquid]

A waterborne resin crosslinking agent-containing liquid was prepared by using each of the polycarbodiimide compounds obtained in Synthesis Examples above.

Details of the surfactant used in the following Examples and Comparative Examples are as follows:

<Surfactant>

C1: Sodium dodecylbenzenesulfonate, anionic

C2: Sodium N-cocoyl methyl taurate, anionic

C3: Sodium lauryl sulfate, anionic
C4: Polyoxyethylene-2-ethylhexyl ether, nonionic

Examples 1 to 3, and 8 to 28, and Comparative Examples 1 to 5

Each waterborne resin crosslinking agent-containing liquid was obtained by stirring and mixing each type of polycarbodiimide compound (A), and polycarbodiimide compound (B) listed in Table 1 below in each amount blended of the compounds therein, at 160° C. for 4 hours, then cooling to 80° C., and diluting with 150 parts by mass of ion exchanged water followed by stirring and mixing the mixture.

Examples 4 to 7

Each waterborne resin crosslinking agent-containing liquid was obtained by stirring and mixing 40 parts by mass of each type of polycarbodiimide compound (A) and 60 parts by mass of each type of polycarbodiimide compound (B), listed in Table 1 below at 160° C. for 4 hours, then cooling to 80° C., and adding 3 parts by mass (in terms of the effective ingredient) of a waterborne solution of the surfactant followed by diluting with 150 parts by mass of ion-exchanged water and stirring and mixing the mixture.

Comparative Examples 6 to 10

Each waterborne resin crosslinking agent-containing liquid was obtained by heating 100 parts by mass of each type of polycarbodiimide compound (A) listed in Table 1 to 60° C., and then diluting it with 150 parts by mass of ion exchanged water followed by stirring and mixing the mixture.

[Evaluation of Waterborne Resin Crosslinking Agent-Containing Liquid]

Each waterborne resin crosslinking agent-containing liquid obtained in Examples and Comparative Examples described above was evaluated for a shelf life (storage stability) as follows. The evaluation results are shown in Table 2 below.

{Shelf Life (Storage Stability)}

The viscosity of each waterborne resin crosslinking agent-containing liquid was measured immediately after production and after storage at 40° C. for 90 days. The shelf life (storage stability) was evaluated by determining the rate of change of the viscosity after 90 days of storage relative to the viscosity immediately after production.

The viscosity was measured by using a B-type viscometer ("TVB-10M;" rotor: TM2, sample volume: 50 mL, temperature: 20° C., rotation speed: 60 rpm, manufactured by Toki Sangyo Co., Ltd.).

The viscosity change rate was evaluated based on the following evaluation criteria. The closer the viscosity change rate is to 0%, the more excellent the storage stability is, and in the case of rating AA to C, it can be deemed that the storage stability is sufficient.

The evaluation results are shown in Table 1 below.

<Evaluation Criteria>

AA: Viscosity change rate of less than 5%
A: Viscosity change rate of 5% or more and less than 10%
B: Viscosity change rate of 10% or more and less than 20%
C: Viscosity change rate of 20% or more and less than 30%
D: Viscosity change rate of 30% or more and less than 50%
E: Viscosity change rate of 50% or more

TABLE 1

| | | Polycarbodiimide compound (A) | | | | | Polycarbodiimide compound (B) | |
|---|---|---|---|---|---|---|---|---|
| | | Type | Diisocyanate | Degree of polymerization | End-capping agent | Amount blended [parts by mass]] | Type | Diisocyanate |
| Examples | 1 | A1 | HMDI | 6 | MP550 | 40 | B1 | IPDI |
| | 2 | A2 | HMDI | 3 | MP550 | 40 | B1 | IPDI |
| | 3 | A3 | HMDI | 9 | MP550 | 40 | B1 | IPDI |
| | 4 | A1 | HMDI | 6 | MP550 | 40 | B1 | IPDI |
| | 5 | A1 | HMDI | 6 | MP550 | 40 | B1 | IPDI |
| | 6 | A1 | HMDI | 6 | MP550 | 40 | B1 | IPDI |
| | 7 | A1 | HMDI | 6 | MP550 | 40 | B1 | IPDI |
| | 8 | A1 | HMDI | 6 | MP550 | 30 | B1 | IPDI |
| | 9 | A1 | HMDI | 6 | MP550 | 20 | B1 | IPDI |
| | 10 | A1 | HMDI | 6 | MP550 | 10 | B1 | IPDI |
| | 11 | A1 | HMDI | 6 | MP550 | 5 | B1 | IPDI |
| | 12 | A1 | HMDI | 6 | MP550 | 70 | B1 | IPDI |
| | 13 | A1 | HMDI | 6 | MP550 | 80 | B1 | IPDI |
| | 14 | A1 | HMDI | 6 | MP550 | 90 | B1 | IPDI |
| | 15 | A1 | HMDI | 6 | MP550 | 40 | B2 | IPDI |
| | 16 | A1 | HMDI | 6 | MP550 | 40 | B3 | IPDI |
| | 17 | A1 | HMDI | 6 | MP550 | 40 | B4 | IPDI |
| | 18 | A1 | HMDI | 6 | MP550 | 40 | B5 | IPDI |
| | 19 | A1 | HMDI | 6 | MP550 | 40 | B6 | IPDI |
| | 20 | A1 | HMDI | 6 | MP550 | 40 | B7 | XDI |
| | 21 | A1 | HMDI | 6 | MP550 | 40 | B8 | TDI |
| | 22 | A1 | HMDI | 6 | MP550 | 40 | B9 | TMXDI |
| | 23 | A4 | TMXDI | 6 | MP550 | 40 | B1 | IPDI |
| | 24 | A5 | HMDI | 6 | MP550/MP208 | 40 | B1 | IPDI |
| | 25 | A6 | HMDI | 6 | MP550/AA | 40 | B1 | IPDI |
| | 26 | A7 | HMDI | 6 | PEG400 | 40 | B1 | IPDI |
| | 27 | A8 | HMDI | 6 | ED-900 | 40 | B1 | IPDI |
| | 28 | A9 | HMDI | 6 | M-1000 | 40 | B1 | IPDI |

TABLE 1-continued

| | | | | | | | | |
|---|---|---|---|---|---|---|---|---|
| Comparative Examples | 1 | A1 | HMDI | 6 | MP550 | 40 | B'1 | HMDI |
| | 2 | A1 | HMDI | 6 | MP550 | 40 | B'2 | MDI |
| | 3 | A1 | HMDI | 6 | MP550 | 40 | B'3 | HDI |
| | 4 | A1 | HMDI | 6 | MP550 | 2 | B1 | IPDI |
| | 5 | A1 | HMDI | 6 | MP550 | 92 | B1 | IPDI |
| | 6 | A1 | HMDI | 6 | MP550 | 100 | — | — |
| | 7 | A10 | MDI | 6 | MP550 | 100 | — | — |
| | 8 | A11 | IPDI | 6 | MP550 | 100 | — | — |
| | 9 | A12 | XDI | 6 | MP550 | 100 | — | — |
| | 10 | A13 | TDI | 6 | MP550 | 100 | — | — |

| | | Polycarbodiimide compound (B) | | | Surfactant | | |
|---|---|---|---|---|---|---|---|
| | | Degree of polymerization | End-capping agent | Amount blended [parts by mass] | Type | Amount blended [parts by mass] | Shelf life |
| Examples | 1 | 3 | CHI | 60 | — | — | A |
| | 2 | 3 | CHI | 60 | — | — | A |
| | 3 | 3 | CHI | 60 | — | — | A |
| | 4 | 3 | CHI | 60 | C1 | 3 | AA |
| | 5 | 3 | CHI | 60 | C2 | 3 | AA |
| | 6 | 3 | CHI | 60 | C3 | 3 | AA |
| | 7 | 3 | CHI | 60 | C4 | 3 | A |
| | 8 | 3 | CHI | 70 | — | — | A |
| | 9 | 3 | CHI | 80 | — | — | A |
| | 10 | 3 | CHI | 90 | — | — | C |
| | 11 | 3 | CHI | 95 | — | — | C |
| | 12 | 3 | CHI | 30 | — | — | A |
| | 13 | 3 | CHI | 20 | — | — | A |
| | 14 | 3 | CHI | 10 | — | — | A |
| | 15 | 5 | C8 | 60 | — | — | A |
| | 16 | 5 | BzOH | 60 | — | — | A |
| | 17 | 5 | IPA | 60 | — | — | A |
| | 18 | 5 | GM/MP208 | 60 | — | — | A |
| | 19 | 5 | AA/CHA | 60 | — | — | A |
| | 20 | 3 | CHI | 60 | — | — | A |
| | 21 | 3 | CHI | 60 | — | — | B |
| | 22 | 5 | C8 | 60 | — | — | B |
| | 23 | 3 | CHI | 60 | — | — | AA |
| | 24 | 3 | CHI | 60 | — | — | A |
| | 25 | 3 | CHI | 60 | — | — | A |
| | 26 | 3 | CHI | 60 | — | — | C |
| | 27 | 3 | CHI | 60 | — | — | C |
| | 28 | 3 | CHI | 60 | — | — | C |
| Comparative Examples | 1 | 3 | CHI | 60 | — | — | A |
| | 2 | 3 | CHI | 60 | — | — | B |
| | 3 | 3 | CHI | 60 | — | — | A |
| | 4 | 3 | CHI | 98 | — | — | D |
| | 5 | 3 | CHI | 8 | — | — | B |
| | 6 | — | — | — | — | — | A |
| | 7 | — | — | — | — | — | D |
| | 8 | — | — | — | — | — | D |
| | 9 | — | — | — | — | — | D |
| | 10 | — | — | — | — | — | D |

[Preparation of Waterborne Resin Composition]

(Waterborne Polyurethane Resin Composition)

Each of the waterborne polyurethane resin compositions was prepared by stirring and mixing 5 parts by mass (2 parts by mass as the crosslinking agent) of each waterborne resin crosslinking agent-containing liquid produced in Examples and Comparative Examples above and 285 parts by mass (100 parts by mass in terms of a resin solid content) of a carboxy group-containing waterborne polyurethane resin ("HYDRAN® WLS-210" with 35% by mass resin solid content, manufactured by DIC Corporation).

(Waterborne Polyester Resin Composition)

Each of the waterborne polyester resin compositions was prepared by stirring and mixing 5 parts by mass (2 parts by mass as the crosslinking agent) of each waterborne resin crosslinking agent-containing liquid produced in Examples and Comparative Examples above and 400 parts by mass (100 parts by mass in terms of a resin solid content) of a carboxy group-modified waterborne polyester resin ("PLASCOAT® Z-730" with 25% by mass resin solid content, manufactured by GOO CHEMICAL CO., LTD.)

(Preparation of Waterborne Acrylic Resin Composition)

Each of the acrylic resin compositions was prepared by stirring and mixing 5 parts by mass (2 parts by mass as crosslinking agent) of each waterborne resin crosslinking agent-containing liquid produced in Examples and Comparative Examples above and 200 parts by mass (100 parts by mass in terms of a resin solid content) of a carboxy group-containing waterborne acrylic resin ("VONCOAT® VF-1060" with 50% by mass of resin solid content, manufactured by DIC Corporation).

[Evaluation of Waterborne Resin Composition]

Each waterborne resin composition prepared above was evaluated for the various items listed below. The evaluation results are shown in Table 2 below.

{Pot Life (Storage Stability)}

The viscosity of each waterborne resin composition was measured immediately after preparation and after storage at 40° C. for 30 days. The pot life (storage stability) was evaluated by determining the rate of change of the viscosity after 30 days of storage relative to the viscosity immediately after production.

The viscosity was measured by using a B-type viscometer ("TVB-10M;" rotor: TM2, sample volume: 50 mL, temperature: 20° C., rotation speed: 60 rpm, manufactured by Toki Sangyo Co., Ltd.).

The viscosity change rate was evaluated based on the following evaluation criteria. The closer the viscosity change rate is to 0%, the more excellent the storage stability is, and in the case of rating A to C, it can be deemed that the waterborne resin composition has sufficient storage stability.

<Evaluation Criteria>

AA: Viscosity change rate of less than 10%

A: Viscosity change rate of 10% or more and less than 20%

B: Viscosity change rate of 20% or more and less than 30%

C: Viscosity change rate of 30% or more and less than 50%

D: Viscosity change rate of 50% or more and less than 100%

E: Viscosity change rate of 100% or more

{Coating Film Hardness}

A surface of a release polyethylene terephthalate (PET) film was coated with the waterborne resin composition by using a bar coater (wire rod No. 32) and the coating film was dried at 80° C. for 10 minutes followed by stood undisturbed for one day at room temperature (25° C.) to form a coating film.

A coating film test piece was obtained by peeling off the release PET film from the coating film.

The coating film test piece underwent a tensile test and a pencil hardness test as described below, and the results of these tests were comprehensively evaluated to obtain film hardness.

(1) Tensile Test

A tensile test was carried out by using a tensile tester (tabletop precision universal testing machine apparatus "AGS-X", manufactured by Shimadzu Corporation; tensile speed 100 mm/min; test piece size: dumbbell-shaped according to JIS No. 4, thickness 30 m; gap between chucks 50 mm) to measure the tensile modulus of 10 coating film test pieces.

The tensile modulus of a coating film without the waterborne resin crosslinking agent (blank) was also measured in the same manner, and the ratio (time) of the tensile modulus of the coating film test piece to the tensile modulus of the blank was determined and scored for evaluation according to the following scoring criteria, and an average point thereof for 10 coating film test pieces was determined and used as an evaluation point.

<Scoring Criteria>

4 points: Tensile modulus of more than twice 3 points: Tensile modulus of more than 1.5 times and twice or less 2 points: Tensile modulus of more than 1.2 times and 1.5 times or less 1 point: Tensile modulus of more than 1.0 time and 1.2 times or less 0 points: Tensile modulus of less than once (2) Pencil Hardness Test Pencil hardness was measured on 10 coating film test pieces by using a pencil hardness tester according to JIS K 5600-5-4:1999.

The measured pencil hardness was scored according to the following scoring criteria, and an average point of the 10 coating film test pieces was calculated and used as an evaluation point.

<Scoring Criteria>

4 points: Pencil hardness 2H or higher 3 points: Pencil hardness F to H 2 points: Pencil hardness HB to 3B 1 point: Pencil hardness 4B-5B 0 points: Pencil hardness 6B For the average points of each evaluation point in the above tensile test and pencil hardness test, the coating film hardness was comprehensively evaluated by the following evaluation criteria. The higher the points, the higher the coating film hardness, and in the case of ratings A to C, it can be deemed that the coating film hardness is sufficiently high.

<Evaluation Criteria>

A: 4 points

B: 3 points or more and less than 4 points

C: 2 points or more and less than 3 points

D: 1 point or more and less than 2 points

E: less than 1 point

{Solvent Resistance of Coating Film}

A surface of an aluminum plate was coated with the waterborne resin composition by using a bar coater (wire rod No. 32) and the coating plate was dried at 80° C. for 10 minutes to prepare a coating film test piece.

The coating film test piece underwent a friction test involving double rubbing the test piece with absorbent cotton (load of 900 g/cm$^2$) impregnated with a 70% by mass ethanol aqueous solution as a solvent 50 times back and forth using a friction tester ("FR-1B," manufactured by Suga Test Instruments Co., Ltd.).

Following the rubbing test, the state of the coating film test piece was visually observed and scored for each of evaluation items: the whitening properties and the proportion of remaining area of the coating film, based on the following evaluation criteria, and the average score of two coating film test pieces was obtained and used as an evaluation score. The solvent resistance of the coating film was comprehensively evaluated from these evaluation items.

<Evaluation Criteria>

(1) Whitening Properties 5 points: No change 4 points: Light rubbing marks or slightly whitened 3 points: Partially whitened 2 points: Overall whitened 1 point: Partially dissolved 0 points: Completely dissolved (2) Proportion of Remaining Area of Coating Film 5 points: 100%

4.5 points: 95% or more and less than 100%

4 points: 85% or more and less than 95%

3.5 points: 75% or more and less than 85%

3.0 points: 60% or more and less than 75%

2.5 points: 45% or more and less than 60%

2.0 points: 40% or more and less than 45%

1.5 points: 25% or more and less than 40%

1 point: 10% or more and less than 25%

0 points: Less than 10%.

The average score of each evaluation score of the above evaluation items was obtained, and the solvent resistance of the coating film was comprehensively evaluated based on the following evaluation criteria. The higher the score, the more excellent the solvent resistance of the coating film, and in the case of rating A to C, it can be deemed that the coating film has sufficiently high solvent resistance.

<Evaluation Criteria>

A: 5 points

B: 4 points or more and less than 5 points

C: 3 points or more and less than 4 points

D: 2 points or more and less than 3 points

E: Less than 2 points

{Wet-On-Wet Coating}

A surface of an aluminum plate was coated with each waterborne resin composition prepared in Examples and Comparative Examples above using an air spray (dry film thickness of 30 m) and the dried film was set for 10 minutes. A surface thereof was coated with the same waterborne resin composition using an air spray (dry film thickness: 15 m, 45 m in total) and the coating film was preheated at 80° C. for 3 minutes for primer coating. A surface of the primer coating film (uncured coating film) was overcoated with a two-component curable polyurethane clear paint ("Body Pen Urethane Clear", manufactured by Soft99corporation) (dry film thickness: 30 m) and the overcoating film was baked at 80° C. to form a multi-layer coating film (cured film by wet-on-wet coating).

No abnormality was visually observed in the appearance of the aforementioned multi-layer coating film in the case of having used any of the waterborne resin compositions as well.

Interlayer adhesion of the multi-layer coating films fabricated by the wet-on-wet coating in the above was evaluated by the method described below. The evaluation results are also shown in Table 2 below.

{Interlayer Adhesion of Multi-Layer Coating Film}

The interlayer adhesion between the layer of the primer coating film and the layer of the overcoating film in the multi-layer coating film was evaluated by a cross-cut test according to ASTM D3359-17.

The test conditions were as follows: a cutter was used to make 6×6 grids at 2 mm intervals on the multi-layer coating film, a tape with an adhesive strength of 6.7 N/cm was adhered thereon at 25° C., and interlayer adhesion was evaluated according to the delamination state (proportion of delamination area) when the tape was peeled off, based on the evaluation criteria below. The smaller the proportion of the delamination area, the higher the interlayer adhesion, and in the case of rating A to C, it can be deemed that the interlayer adhesion is sufficiently high.

<Evaluation Criteria>

A: Proportion of delamination area of 0%

B: Proportion of delamination area of 0% or more and less than 5%

C: Proportion of delamination area of 5% or more and less than 15%

D: Proportion of delamination area of 15% or more and less than 35%

E: Proportion of delamination area of 35% or more

TABLE 2

| | | Waterborne polyurethane resin composition | | | | Waterborne polyester resin composition | | | | Waterborne acrylic resin composition | | | |
|---|---|---|---|---|---|---|---|---|---|---|---|---|---|
| | | | Coating film | | Wet-on-wet | | Coating film | | Wet-on-wet | | Coating film | | Wet-on-wet |
| | | Pot life | Hardness | Solvent resistance | Interlayer adhesion | Pot life | Hardness | Solvent resistance | Interlayer adhesion | Pot life | Hardness | Solvent resistance | Interlayer adhesion |
| Examples | 1 | AA | A | A | A | AA | A | A | A | AA | A | A | A |
| | 2 | A | A | A | A | A | A | A | A | A | A | A | A |
| | 3 | A | A | A | A | A | A | A | A | A | A | A | A |
| | 4 | AA | A | A | A | AA | A | A | A | AA | A | A | A |
| | 5 | AA | A | A | A | AA | A | A | A | AA | A | A | A |
| | 6 | AA | A | A | A | AA | A | A | A | AA | A | A | A |
| | 7 | A | A | A | A | A | A | A | A | A | A | A | A |
| | 8 | A | A | B | B | A | A | C | C | A | A | C | C |
| | 9 | B | A | B | C | B | A | C | C | A | A | B | C |
| | 10 | C | B | B | C | C | B | C | C | C | B | C | C |
| | 11 | C | C | B | C | C | C | C | C | C | C | C | C |
| | 12 | A | A | B | C | A | A | C | C | A | A | B | C |
| | 13 | B | B | B | C | B | B | C | C | A | B | B | C |
| | 14 | C | B | B | C | C | B | C | C | C | B | C | C |
| | 15 | A | A | B | C | A | A | C | C | A | A | B | C |
| | 16 | A | A | B | C | A | A | C | C | A | A | B | C |
| | 17 | A | A | B | C | A | A | C | C | A | A | B | C |
| | 18 | A | A | B | C | A | A | C | C | A | A | B | C |
| | 19 | A | A | B | C | A | A | C | C | A | A | B | C |
| | 20 | A | A | A | A | A | A | A | A | A | A | A | A |
| | 21 | C | A | B | C | C | A | C | C | C | A | B | C |
| | 22 | A | B | C | C | A | B | C | C | A | B | C | C |
| | 23 | A | A | C | B | A | A | C | B | A | A | C | C |
| | 24 | B | A | C | A | A | A | C | B | A | A | C | B |
| | 25 | B | A | C | A | A | A | C | B | A | A | C | B |
| | 26 | C | C | B | C | C | C | C | C | C | C | C | C |
| | 27 | C | C | B | C | C | C | C | C | C | C | C | C |
| | 28 | C | C | B | C | C | C | C | C | C | C | C | C |
| Comparative Examples | 1 | B | E | D | D | B | E | D | D | B | E | D | D |
| | 2 | C | E | D | D | C | E | D | D | C | E | D | D |
| | 3 | AA | E | A | A | AA | E | A | A | AA | E | A | A |
| | 4 | C | E | D | D | C | E | D | D | C | E | D | D |
| | 5 | E | E | D | D | E | E | D | D | E | E | D | D |
| | 6 | D | E | D | D | D | E | D | D | D | E | D | D |
| | 7 | E | E | D | D | E | E | D | D | E | E | D | D |
| | 8 | E | C | C | C | E | C | C | C | E | C | C | C |
| | 9 | E | C | C | C | E | C | C | C | E | C | C | C |
| | 10 | E | C | C | C | E | C | C | C | E | C | C | C |

As can be seen from the results shown in Tables 1 and 2, it was found that the waterborne resin crosslinking agent of the present invention had excellent storage stability of the prepared liquid containing the same, and excellent storage stability when co-present with the waterborne resin (waterborne resin composition), and could furthermore improve the hardness and solvent resistance of the coating films of various types of cured products of waterborne resins. It was also found that the cured films with the multi-layer coating films with favorable interlayer adhesion was formed also in wet-on-wet coating.

The invention claimed is:

1. A waterborne resin crosslinking agent, comprising a polycarbodiimide compound (A) and a polycarbodiimide compound (B), wherein the polycarbodiimide compound (A) has a structure in which isocyanate groups at both terminals are each capped with a hydrophilic organic compound, and at least one of the hydrophilic organic compounds has a molecular weight of 340 or more, the polycarbodiimide compound (B) has, as a structural unit, a diisocyanate compound having one cyclohexyl ring or one benzene ring, and has a structure in which isocyanate groups at both terminals are each capped with an organic compound having a molecular weight of 300 or less, the polycarbodiimide compound (A) is in an amount of 5 to 90 parts by mass per 100 parts by mass in total of the polycarbodiimide compound (A) and the polycarbodiimide compound (B), the polycarbodiimide compound (A) is a product of a decarboxylation condensation reaction of a diisocyanate compound, and wherein the degree of polymerization of carbodiimide groups in the polycarbodiimide compound (A) is 5 to 7.

2. The waterborne resin crosslinking agent according to claim 1, wherein the hydrophilic organic compound having a molecular weight of 340 or more is a compound represented by the following formula (1):

$$R^1(OCHR^2CH_2)_nOH \quad (1)$$

wherein $R^1$ is an alkyl group, cycloalkyl group, or aryl group having 1 to 20 carbon atoms, $R^2$ is a hydrogen atom or a methyl group, and n is a numeral of 7 to 30.

3. The waterborne resin crosslinking agent according to claim 2, wherein, in the formula (1), $R^1$ is a methyl group and $R^2$ is a hydrogen atom.

4. The waterborne resin crosslinking agent according to claim 1, wherein the organic compound having a molecular weight of 300 or less is a compound having one functional group that reacts with an isocyanate group.

5. The waterborne resin crosslinking agent according to claim 1, wherein the organic compound having a molecular weight of 300 or less is a compound selected from the group consisting of a primary or secondary monoamine, a monoisocyanate, a monool, a monoepoxide, and a monocarboxylic acid.

6. The waterborne resin crosslinking agent according to claim 1, wherein the diisocyanate compound is a compound having a primary isocyanate group.

7. A waterborne resin crosslinking agent-containing liquid, comprising the waterborne resin crosslinking agent according to claim 1, and an aqueous medium.

8. The waterborne resin crosslinking agent-containing liquid according to claim 7, wherein the aqueous medium is water or a mixed solvent of water and a hydrophilic solvent.

9. The waterborne resin crosslinking agent-containing liquid according to claim 7, further comprising a surfactant.

10. The waterborne resin crosslinking agent-containing liquid according to claim 9, wherein the surfactant is an anionic surfactant.

11. The waterborne resin crosslinking agent-containing liquid according to claim 10, wherein the anionic surfactant is one or more selected from the group consisting of an alkylbenzenesulfonate, an alkylsulfate, and sodium N-cocoyl methyl taurate.

12. A waterborne resin composition, comprising the waterborne resin crosslinking agent according to claim 1 and a waterborne resin.

13. The waterborne resin composition according to claim 12, wherein the waterborne resin has a functional group selected from the group consisting of a carboxy group, an amino group and a hydroxyl group.

14. The waterborne resin composition according to claim 12, wherein the waterborne resin is one or more selected from the group consisting of a polyester resin, an acrylic resin, a polyurethane resin, an epoxy resin, a styrene-acrylic resin, a melamine resin, a polyolefin resin, and a fluororesin.

15. The waterborne resin composition according to claim 12, wherein the waterborne resin composition is used for an adhesive, a fiber treatment agent, a coating agent, an ink, a paint, or a pressure-sensitive adhesive.

16. The waterborne resin composition according to claim 12, wherein the waterborne resin composition is for wet-on-wet coating.

17. A cured film formed of the waterborne resin composition according to claim 12.

18. An article comprising the cured film according to claim 17 formed on a base material.

* * * * *